United States Patent [19]

Kovacik et al.

[11] 4,350,850
[45] Sep. 21, 1982

[54] SELF-SWITCHING ELECTRIC CORD REEL

[75] Inventors: James W. Kovacik; James D. Kovacik, both of Parma; Thomas J. Blanch, Aurora; Paul S. Blanch, Garfield Heights, all of Ohio

[73] Assignee: Alert Stamping & Manufacturing Company, Inc., Bedford Heights, Ohio

[21] Appl. No.: 168,597

[22] Filed: Jul. 14, 1980

[51] Int. Cl.³ ......................................... H02G 11/00
[52] U.S. Cl. ........................... 191/12.2 R; 200/61.15; 200/153 F
[58] Field of Search ..................... 191/12.2 R, 12.4; 200/61.14, 61.15, 153 F

[56] References Cited

U.S. PATENT DOCUMENTS

| 1,342,015 | 6/1920 | Cuno | 200/153 F |
| 1,357,900 | 11/1920 | Redmon et al. | 200/153 F |
| 1,362,344 | 12/1920 | Oakley | 200/153 F |
| 1,364,805 | 1/1921 | Redmon et al. | 200/153 F |
| 1,689,098 | 10/1928 | Wyman | 200/153 F |
| 1,691,400 | 11/1928 | Mitchell | 200/153 F |
| 2,453,407 | 11/1948 | Burns | 191/12.2 R |
| 2,927,170 | 3/1960 | Brown | 200/61.14 |
| 3,808,382 | 4/1974 | Blanch et al. | 200/153 F |
| 3,904,843 | 9/1975 | Kendechy | 200/153 F |

Primary Examiner—Richard A. Schacher
Attorney, Agent, or Firm—Wilson, Fraser, Barker & Clemens

[57] ABSTRACT

A self switching electric cord reel is disclosed in which a switch for energizing and de-energizing the electric cord is located on a housing of the reel itself. The switch is electrically serially connected with the electric cord and actuated by a pivotally mounted lever switch means, one arm of which operates the switch, and the other arm of which extends across an opening of the housing through which the electric cord passes. An enlargement of the electric cord contacts and pivots the lever switch means to operate the switch. The present self-switching electric cord reel is characterized by using a simpler and less expensive switch and design than formerly were employed, and by adapting the lever switch means to absorb or transmit the mechanical shock of its pivotal operation to the housing in preference to transmitting the shock to the switch.

10 Claims, 6 Drawing Figures

SELF-SWITCHING ELECTRIC CORD REEL

BACKGROUND OF THE INVENTION

This invention relates to a self-switching electric cord reel adapted for electrical connection to portable electric appliances.

Electric cord reels have been in use for many years, such as for paying out and receiving electric cord for lead lights, various electrical household appliances like sweepers, light guards, sometimes referred to as trouble lights, and in general wherever insulated electric conductors are to be optionally extended and retracted with respect to a relatively stationary point.

As an example, in many service areas, such as automotive service stations, machine shops, and the like, it is helpful for a workman to have a portable trouble light which he can carry to and secure about a work site in order to provide better illumination. Electric cord reels are commonly used to support and electrically energize such portable lights. The reel is fixed at a suitable location. A sufficient length of electric cord is then pulled from the reel to place the trouble light or the like at a desired location. When the workman is finished, the cord is rewound onto the reel.

Previously, trouble lights, light guards, and other electrical appliances useful with an electric cord reel have had a switch located directly on the appliance, so that a worker could easily and conveniently turn the appliance on and off at that point. However, this practice can present a safety hazard in that electric short circuits and shocks are thought more apt to result due to wearing or damage to the switch over a period of use. Governmental regulations may also require that electrical appliances like trouble lights do not have switches or other likely points of electrical contact on or near the appliance.

While exterior designs may vary, electric cord reels basically comprise a reel and shaft mounted to rotate relatively to each other; cooperating ratchet and pawl means carried by the shaft and reel to arrest the turning of a reel at one of several selective rotary stations when the length of the cord paid out reaches a desired length; a coiled spring designed to rotate the reel in an opposite direction and rewind the cord back onto the reel when the ratchet and pawl means are disengaged; and electrical input means for energizing the insulated electrical cord itself.

U.S. Pat. No. 3,904,843 to Joseph A. Kendechy discloses a self-retracting reel for an electric cord that is self-switching at the reel. Automatic switching of current in the electric cord occurs in response to whether the cord is wound or unwound from the reel.

The often reversing rotary movement of a reel creates mechanical shocks on the reel construction which are often augmented by jerking the electric cord or otherwise mistreating the reel during use. In this manner, a reel can be subjected to undue stress and strain, thereby shortening its useful life. In a reel of the type proposed in the cited Kendechy patent, mechanical shocks and vibrations on the reel and especially on the switch mounted on the reel are further induced by a lever mounted on the reel housing which pivots to open and close the switch by direct contact with it.

The switch of the Kendechy patent is also a rather complicated microswitch which requires added structure and detail on the reel, not only to operate the switch but to protect it against damage. Thus, Kendechy uses a microswitch having an operating arm and roller means attached to the free end of the arm. A cover which partially encloses the microswitch construction on the Kendechy reel is mounted on a side of the housing and provided with window means formed in its edge through which extends the roller means of the microswitch arm. A stop attached to the electric cord trips a lever which engages the roller means at the end of the microswitch operating arm and thereby operates the switch.

U.S. Pat. No. 3,808,382 to Charles H. Blanch and James W. Kovacik discloses an electric cord reel construction which includes a hub portion around which an electric cord is wound. The hub portion has a limited degree of free radial movement with respect to a shaft about which the reel relatively rotates. As a result, the reel is resiliently mounted with respect to the shaft and can absorb or interrupt mechanical jars transmitted to the hub portion. In use, the hub portion has a limited resilient movement radially of the reel which can be effected by sudden or excessive pulls or jerks upon the electric cord. However, such movement cannot exceed a predetermined amount, since it is checked upon eventual contact by the hub portion with another member of the reel.

SUMMARY OF THE INVENTION

An object of the invention is to provide an improved electric cord reel of the self-switching type in which automatic switching of current in the electric cord takes place on the reel housing itself. Another object is to provide a self-switching electric cord reel in which a simpler and less expensive switch can be used and with savings in design and construction of the reel in order to incorporate it. A related object is to provide such a reel which includes shock-absorbing means to absorb or transmit the mechanical shocks, jars, and the like of operating the reel to other parts of the reel preferentially to their absorption or transmission to the switch, thereby to preserve and prolong the useful life of the switch.

In one form, the present invention embodies a self-switching electric cord reel comprising a housing and a reel mounted for rotation in the housing. The reel contains an electric cord and the housing has an opening through which to pass the electric cord. A switch carried with respect to the housing is electrically serially connected with the electric cord to energize and deenergize it. Lever switch means pivotally mounted with respect to the housing extends across the housing opening and is adapted to operate the switch upon pivoting. Means on the electric cord operate the lever switch means as the cord travels lengthwise. Mechanical shock-absorbing means on the lever switch means strikes the reel housing upon pivoting of the lever switch means and attendant operation of the switch to absorb or transmit the mechanical shock of the pivoting to the reel construction preferentially rather than to the switch.

Preferably, the housing is circular and the opening through which the electric cord passes is on the circumferential periphery of the housing. In the present reel, the switch may be a simple single-pole, single-throw switch. In the preferred embodiment, the switch is normally closed, and pivoting of the lever switch means by means on the electric cord for operating it opens the switch as the cord is rewound on the reel. The lever switch means may be L-shaped in which one arm extends across the housing opening, and the other arm contacts the switch to operate it upon pivoting of the lever switch means.

DESCRIPTION OF THE PREFERRED EMBODIMENTS

Figure 1:
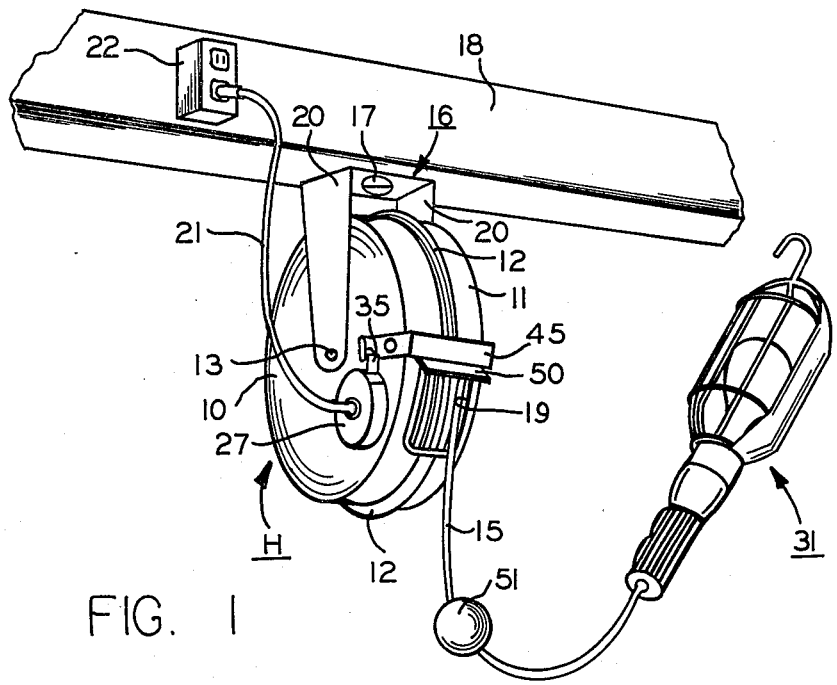
FIG. 1 is a perspective view of a present reel and its housing and illustrates lead-in electrical conduit and a trouble light electrically connected to a free end of an electric cord.

Referring to the drawing, the illustrated embodiment comprises a housing generally represented at H which comprises two similar, circular, pan-shaped sections 10 and 11. An elastomeric band 12 having opposed side grooves (not shown) receives the edges of the rims of sections 10 and 11 in the grooves and holds them integrally together. A reel is mounted for free rotation within housing H about a stationary shaft 13 and comprises spaced-apart flanges 14 (FIG. 2) joined by a central hub portion around which a standard electric cord 15 is wound. An inverted U-shaped bracket 16 secures housing H to a suitable support. A bolt 17 fixes a bight portion of bracket 16 to an overhead beam 18, while legs 20 of the bracket have openings to receive stationary shaft 13 to which the legs are suitably fixed as by peening over ends of shaft 13, or by spot welding, or the like.

A pigtail 21 electrically connects a conventional grounded electrical outlet 22 of beam 18 through a switch 23 (FIG. 6) within a cover plate 27 on the side of housing section 10 and then through contact brushes 28 and 29 (FIG. 5) to conventional commutator rings carried by the reel to complete electrical connection with cord 15. The cord passes through an entrance and exit opening 19 on the circumferential periphery of housing H and is electrically connected at its free end to a light guard generally represented at 31. The light guard or trouble light may be of the type disclosed in U.S. Pat. No. 3,119,568 to Broder, although other electrical appliances can be substituted for light guard 31 if desired.

Considering more particularly the structure of switch 23 and its manner of operation, a cup-shaped cover plate 27 has an outwardly extending flange 26 that is rivited to a side of housing 10. Cover plate 27 contains switch 23 and is the site of its operational connections, both electrical and mechanical. The electrical, two-conductor conduit of pigtail 21 passes through an opening 30 in cover plate 27 and, within the space between plate 27 and housing section 10, pigtail 21 is divided into its two conductors 21a and 21b (FIG. 6) which are still covered with insulation. Thin sheets 31 of a suitable insulating material preferably line the interior surfaces of cover 27 and housing section 10 that are adjacent to exposed electrical conductors. Insulating sheets 31 extend over the top surface of cover 27, the area of housing section 10 under and around switch 23, and the peripheral wall of cover 27 adjacent to switch 23.

Conductor 21a passes directly through an opening 32 in housing section 10 to reach its other side, while conductor 21b is soldered to a terminal 34 of switch 23 which is secured in position under cover plate 27. Switch 23 is of simple and conventional construction and generally consists of a single-pole, single-throw switch that is actuated by an operating arm 35 is a known manner. Preferably, operating arm 35 is spring-loaded to urge it to a position which closes switch 23, so that the switch is normally closed. A further conductor 21c, soldered to a second terminal 36 on switch 23 is like conductor 21b and in the manner of conductor 21a passes directly through opening 32 in housing section 10 to reach its other side.

Figure 5:
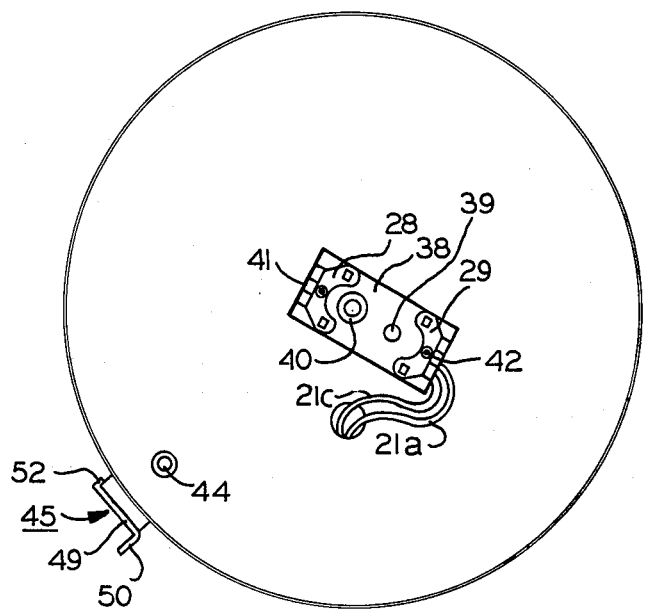
FIG. 5 is a side elevational view of the inside of the housing section shown in FIG. 2.
Figure 6:
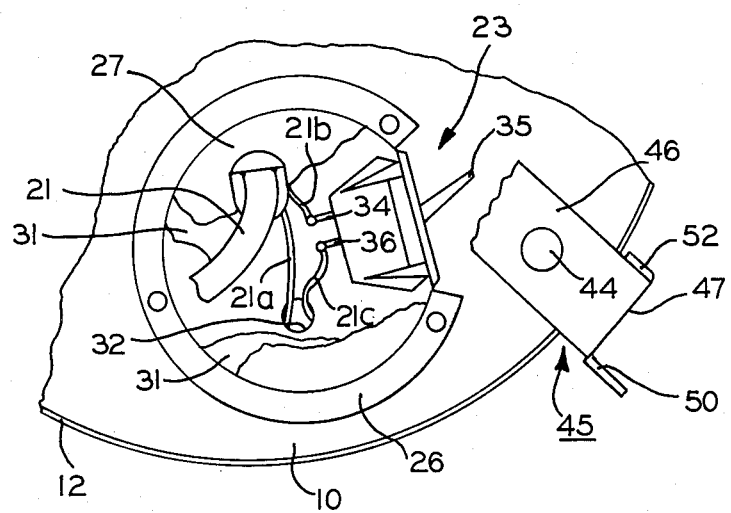
FIG. 6 is an enlarged, fragmentary view, partly in section, of the cover plate of FIG. 2 and shows a detailed view of the switch and its connections.

Within housing H, conductors 21a and 21c connect to contact brushes which resiliently engage commutator rings concentrically carried by the rotatable reel in a known manner. In FIG. 5, for example, a contact block 38 is secured to the inside of housing section 10 as by a rivet 39 and has an opening 40 that freely passes shaft 13. Block 38 carries arcuate, resilient contact brushes 28 and 29 to which conductors 21c and 21a are respectfully connected as at 41 and 42.

The interior structure of the electric cord reel is of standard construction, does not form part of the present invention, and therefore is not described in detail. For example, contact brushes 28 and 29 rub against commutator rings in a known manner to pass on an electric potential to the inner end of electric cord 15. In like manner, the reel may contain cooperating ratchet and pawl structures which arrest the turning of a reel at one of several selective rotary stations when the length of cord 15 released or paid out reaches a desired length. The ratchet and pawl are subsequently disengaged in a known manner to release the reel at such an arrested station when it is desired to return or rewind the cord back onto the reel. At this time, a coiled spring positioned within the wound cord on the reel urges the reel toward a home position or one in which the cord is rewound upon the reel.

Examples of commutator rings, ratchet and pawl combinations, and coil springs to urge the reel in a wound position as well as how these elements may be incorporated and operated in an electric cord reel are described by the following U.S. patents which are hereby incorporated by reference: No. 3,432,623 to Charles H. Blanch and Henry F. Olzak; No. 3,450,369 to Charles H. Blanch and Henry F. Olzak; No. 3,619,518 to Charles H. Blanch and James W. Kovacik; and No. 3,808,382 to Charles H. Blanch and James W. Kovacik.

Considering next the physical actuation of switch 23, an enlargement on cord 15 pivots a lever which actuates operating arm 35 of the switch. A significant aspect of the present invention is that the lever which operates the switch is designed to absorb or transmit shocks in preference to the switch and thereby protect the switch from the bumping and jarring it would otherwise receive.

In the illustrated embodiment, a stud pivot pin 44 pivotally mounts an L-shaped lever 45 on housing section 10 intermediate switch 23 and its operating arm 35 and the peripheral opening 19 on housing H. Lever 45 is so balanced that it pivots in a clockwise direction as viewed in FIG. 2 when left to pivot under its own weight.

Figure 2:
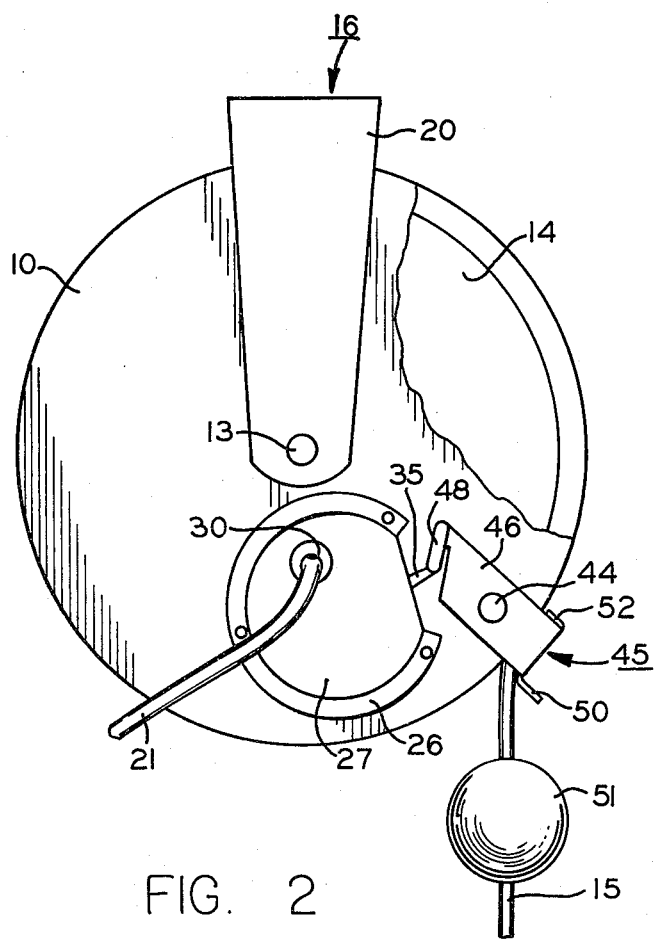
FIG. 2 is a side elevational view, partly in section, of the reel and housing of FIG. 1 and shows a cover for a switch of the reel, lever switch means which operates this switch, and part of a flange of the reel within the housing.
Figure 3:
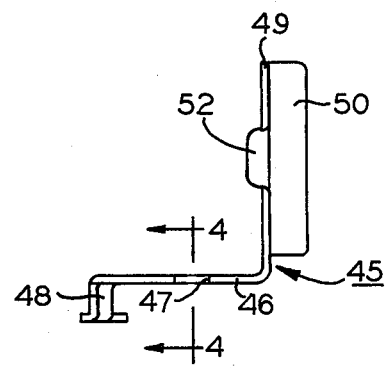
FIG. 3 is a plan view of the lever switch means of FIGS. 1 and 2.
Figure 4:
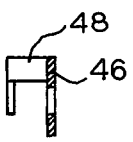
FIG. 4 is a section of FIG. 3 on the line 4—4.

As shown in FIG. 3, lever 45 has two arms. One arm 46 which has an opening 47 to receive pivot pin 44 extends toward operating arm 35 of switch 23 and terminates in a crook portion 48 which hooks about arm 35, as illustrated by FIGS. 1 and 2, to trip it. The other arm 49 of lever 45 extends across opening 19 of housing H and has a flange 50 disposed at an angle to arm 49 along its bottom edge as viewed in FIG. 1. A ball stop 51 on cord 15 strikes flange 50 upon being rewound onto the reel. In order to protect switch 23 from all of the strain and striking force when ball stop 51 strikes flange 50 and thereby operates switch 23, there is a shock-absorbing tab 52 disposed at an angle to arm 49 like flange 50 but in the opposite direction and along the opposite or upper edge of arm 49.

During periods of non-use, cord 15 is wound onto reel to the extent that ball stop 51 strikes flange 50 of lever 45, thereby tripping operating arm 35 by arm 46 of the lever to operate switch 23. This interrupts the flow of current from pigtail 21 to cord 15 of the reel.

As soon as cord 15 is pulled outwardly from the reel, lever 45 is free to pivot in a clockwise direction as viewed in FIG. 2. This lifts lever arm 46 from operating arm 35 of the switch. Since arm 35 is spring-loaded to move to a closed position when unimpeded, arm 35 easily passes through the crook portion 48 of arm 46 and upon reaching the closed position of the switch electrically energizes cord 15. When the cord is later rewound on the reel, ball stop 51 again strikes flange 50 and operates lever 45 to trip operating arm 35 and open switch 23.

Particularly when ball stop 51 strikes flange 50 to pivot the lever 45 as just described, shock-absorbing tab 52 strikes the edge of opening 19 or any adjacent part of the housing H. This in turn transmits the shock of the impact to the housing rather than to switch 23 and protects the switch from the brunt of the mechanical bumping and vibrating which would otherwise be directed onto it. Lever 45 thus has incorporated with it an overriding protective structure for switch 23, and the present reel can use a simpler and less expensive switch than formerly employed because of this preferential absorption of shock by the reel structure itself.

While the foregoing describes a presently preferred embodiment, it is understood that the invention may be practiced in still other forms within the scope of the following claims.

We claim:

1. A self-switching electric cord reel comprising a housing, a reel rotationally mounted in the housing and containing an electric cord, said housing having an opening through which to pass said electric cord, a switch carried with respect to the housing and electrically serially connected with said electric cord to energize and de-energize the cord, lever means pivotally mounted with respect to said housing and having one arm portion extending across said housing opening and another arm portion adapted to operate said switch upon pivoting, means on said electric cord for pivoting said lever means as said cord travels lengthwise, and mechanical shock-absorbing means on said lever means adapted to strike said housing upon pivoting of said lever means sufficient to operate said switch, thereby to absorb the mechanical shock of said pivoting movement preferentially to said switch.

2. The self-switching electric cord reel of claim 1 in which said housing is circular and said opening is on the circumferential periphery of said housing.

3. The self-switching electric cord reel of claim 1 in which said switch is a single-pole, single-throw switch.

4. The self-switching electric cord reel of claim 1 in which said switch has an operating arm, and said other arm portion of the lever means has a crook portion within which to catch said operating arm and trip it.

5. The self-switching electric cord reel of claim 1 in which said means for operating the lever switch means is an enlargement of said electric cord adapted to engage said lever switch means.

6. The self-switching electric cord reel of claim 1 in which said mechanical shock-absorbing means on said lever switch means is a striker tab adapted to strike the housing adjacent said opening.

7. An electric cord reel including:
  a. a housing substantially enclosed except for an entrance and exit opening,
  b. a reel rotationally mounted within the housing,
  c. an electric cord wound upon said reel and having a free end adapted to be paid out and retracted through said entrance and exit opening,
  d. a switch mounted on a side of said housing and electrically serially connected with said electric cord, said switch being adapted to energize and de-energize said electric cord from closed and open positions, respectively,
  e. an L-shaped, lever switch means pivotally mounted on said housing adjacent said housing opening, one arm of the lever switch means being adapted to contact said switch and operate it, the other arm extending across said housing opening and having mechanical shock-absorbing means adapted upon pivoting of said lever switch means to strike said housing and transmit such mechanical shock preferentially to said housing rather than to said switch, and
  f. means on the electric cord to contact and pivot said lever switch means upon lengthwise travel of said cord toward said housing opening and onto said reel.

8. The electric cord reel of claim 7 in which an electrical appliance is electrically attached to said free end of said electric cord.

9. The electric cord reel of claim 7 in which said switch is a normally closed switch, and said contacting and pivoting of the lever switch means by said means on the electric cord opens said switch.

10. The electric cord reel of claim 7 in which said switch is a single-pole, single-throw switch.

* * * * *